(12) United States Patent
Ishizaka (10) Patent No.: US 8,403,001 B2
(45) Date of Patent: Mar. 26, 2013

(54) CONNECTOR FOR FUEL TANK AND CHECK VALVE

(75) Inventor: Taiichi Ishizaka, Sagamihara (JP)

(73) Assignee: Nifco Inc., Yokohama-Shi (JP)

( * ) Notice: Subject to any disclaimer, the term of this patent is extended or adjusted under 35 U.S.C. 154(b) by 0 days.

(21) Appl. No.: 12/998,741

(22) PCT Filed: Nov. 13, 2009

(86) PCT No.: PCT/JP2009/069321
§ 371 (c)(1),
(2), (4) Date: Jun. 17, 2011

(87) PCT Pub. No.: WO2010/061734
PCT Pub. Date: Jun. 3, 2010

(65) Prior Publication Data
US 2011/0259447 A1   Oct. 27, 2011

(30) Foreign Application Priority Data
Nov. 26, 2008   (JP) .................................. 2008-300590

(51) Int. Cl.
*B60K 15/04* (2006.01)
*F16K 15/03* (2006.01)

(52) U.S. Cl. .................. 137/592; 137/515; 137/527

(58) Field of Classification Search .................. 137/515, 137/527, 590, 592; 285/45, 55, 319
See application file for complete search history.

(56) References Cited

U.S. PATENT DOCUMENTS

| | | | | |
|---|---|---|---|---|
| 6,019,127 A * | 2/2000 | Orita et al. | ..................... | 137/592 |
| 6,240,957 B1 * | 6/2001 | Hattori | ........................... | 137/592 |
| 6,296,014 B1 * | 10/2001 | Miura et al. | .................. | 137/592 |
| 6,675,843 B2 * | 1/2004 | Yonezawa et al. | ............ | 137/592 |
| 6,808,209 B2 * | 10/2004 | Nakaya et al. | .................. | 285/55 |
| 6,895,998 B2 * | 5/2005 | Aoki et al. | ...................... | 137/592 |
| 7,082,964 B1 * | 8/2006 | Yoshizawa et al. | ........... | 137/592 |
| 7,455,326 B2 * | 11/2008 | Matsuzaki et al. | ......... | 285/288.1 |
| 2003/0015526 A1 * | 1/2003 | Nakaya et al. | ............... | 220/4.14 |
| 2003/0116202 A1 * | 6/2003 | Krishnamoorthy et al. | .. | 137/593 |
| 2005/0067027 A1 * | 3/2005 | Kaneko | ......................... | 137/592 |
| 2005/0121105 A1 * | 6/2005 | Kaneko | ......................... | 141/301 |

FOREIGN PATENT DOCUMENTS

| | | |
|---|---|---|
| JP | 2000-249239 | 9/2000 |
| JP | 2005-127501 | 5/2005 |
| JP | 2006-009850 | 1/2006 |

\* cited by examiner

*Primary Examiner* — John Rivell
(74) *Attorney, Agent, or Firm* — Manabu Kanesaka (57) ABSTRACT

A connector for a fuel tank includes a cylindrical main body; a connecting cylinder body including an attachment portion of a pipe connecting the fuel tank and an external portion, and assembled with the cylindrical main body; and a reinforcing cylinder body housed inside the connecting cylinder body. By a stopper portion formed on an inside of the connecting cylinder body, and a holding end portion of the cylindrical main body positioned inside the connecting cylinder body by the above-mentioned assembling, the reinforcing cylinder body is sandwiched from both sides so that the reinforcing cylinder body is positioned on an inside of the attachment portion of the connecting cylinder body.

11 Claims, 6 Drawing Sheets

CONNECTOR FOR FUEL TANK AND CHECK VALVE

FIELD OF TECHNOLOGY

The present invention relates to a connector used for connecting a fuel tank and a pipe which communicates this fuel tank with an external portion, and an improvement of a check valve constituted by using the above.

BACKGROUND ART

As a valve connecting the fuel tank and an external plumbing, there is one shown in Patent Document 1. This valve is made by assembling a fixing housing, a collar, and a valve case. In such valve, the valve case is provided with an elastic locking piece engaged with an upper end portion of the collar, and an annular rib engaged with a lower end portion of this collar, so that the collar is built in an inside of such valve case. By fitting the valve case, in which the collar is built in such a manner, in an inside of a connecting pipe portion of the external plumbing in the fixing housing, the above-mentioned collar is positioned in the inside of this connecting pipe portion so as to reinforce this connecting pipe portion.

However, in such valve, the above-mentioned valve case is required to be provided with the elastic locking piece relative to the collar, and the elastic locking piece relative to the connecting pipe portion of the fixing housing. Also, since the valve case has to be intervened between this connecting pipe portion and the collar, it was inappropriate from the standpoint of ensuring a flow channel for fuel in the inward of this connecting pipe portion as widely as possible.

PRIOR ART DOCUMENT

Patent Document

Patent Document 1: Japanese Published Unexamined Patent Application No. 2005-127501 (Paragraph Number [0043] and FIG. 8)

SUMMARY OF THE INVENTION

Problems to be Solved by the Invention

The main features which the present invention attempts to solve reside in that the connector (the valve of the Patent Document 1) used for connecting the fuel tank and the pipe, and a reinforcing cylinder body (the collar of the Patent Document 1) in the check valve constituted by using the connector, are allowed to be appropriately positioned in the inward of an attachment portion of the pipe with a very simple structure, and also that in the inward of this attachment portion, the flow channel for fuel can be ensured as widely as possible.

Means for Solving the Problems

In order to achieve the above-mentioned objects, in the present invention, a connector for a fuel tank includes a cylindrical main body; a connecting cylinder body comprising an attachment portion of a pipe connecting a fuel tank and an external portion, and assembled with this cylindrical main body; and a reinforcing cylinder body housed inside this connecting cylinder body. Also, by a stopper portion formed on an inside of the connecting cylinder body, and a holding end portion of the cylindrical main body positioned inside this connecting cylinder body by the above-mentioned assembling, the reinforcing cylinder body is sandwiched from both sides thereof, so that this reinforcing cylinder body is positioned on an inside of the attachment portion of the connecting cylinder body.

According to such structure, by combining the cylindrical main body with this connecting cylinder body from a state wherein this reinforcing cylinder body is inserted into an inside of the attachment portion of the connecting cylinder body up to a position where one end of a cylinder of the reinforcing cylinder body hits the above-mentioned stopper portion, the reinforcing cylinder body can be installed on the inside of such attachment portion. Then, by the reinforcing cylinder body installed in such a manner, rigidity capable of being connected with a fuel supply pipe and the like, and further capable of being tightened firmly by a hose band and the like, can be provided to the attachment portion of the connecting cylinder body.

A valve body may be provided in such cylindrical main body so as to close a flow channel of this cylindrical main body to be openable, or so as to be able to close the flow channel of this cylindrical main body.

Also, in order to achieve the above-mentioned objects, in this invention, a check valve for a fuel tank includes a cylindrical main body comprising valve body; a connecting cylinder body comprising an attachment portion of a fuel supply pipe, and assembled with this cylindrical main body; and a reinforcing cylinder body housed inside this connecting cylinder body. By the stopper portion formed on the inside of the connecting cylinder body, and the holding end portion of the cylindrical main body positioned inside this connecting cylinder body by the above-mentioned assembling, the reinforcing cylinder body is sandwiched from both sides thereof, so that this reinforcing cylinder body is positioned on the inside of the attachment portion of the connecting cylinder body.

According to such structure, by combining the cylindrical main body with this connecting cylinder body from the state wherein this reinforcing cylinder body is inserted into the inside of the attachment portion of the connecting cylinder body up to the position where one end of the cylinder of the reinforcing cylinder body hits the above-mentioned stopper portion, the reinforcing cylinder body can be installed on the inside of such attachment portion. Then, by the reinforcing cylinder body installed in such a manner, rigidity capable of being connected with the fuel supply pipe and the like, and further capable of being tightened firmly by the hose band and the like, can be provided to the attachment portion of the connecting cylinder body.

If an internal diameter of a holding end portion side of such cylindrical main body is made so as to be approximately equal to an internal diameter of the reinforcing cylinder body, the above-mentioned structure which allows to position the reinforcing cylinder body never blocks a flow of fuel sent from the fuel supply pipe.

Also, if a projection protruding toward a center of this cylindrical main body is formed in the holding end portion of such cylindrical main body, due to such projection, the reinforcing cylinder body can be reliably supported by the holding end portion.

Effect of the Invention

In the connector and the check valve according to the present invention, the reinforcing cylinder body is positioned in the inward of the attachment portion by being sandwiched from both sides by the stopper portion formed on the inside of the connecting cylinder body and the holding end portion of the cylindrical main body positioned inside this connecting cylinder body. Accordingly, the reinforcing cylinder body can be positioned on the inward of the attachment portion of the pipe appropriately with a simple structure. Also, in the inward of this attachment portion, the flow channel for fuel can be ensured as widely as possible.

BEST MODES OF CARRYING OUT THE INVENTION

Figure 1:
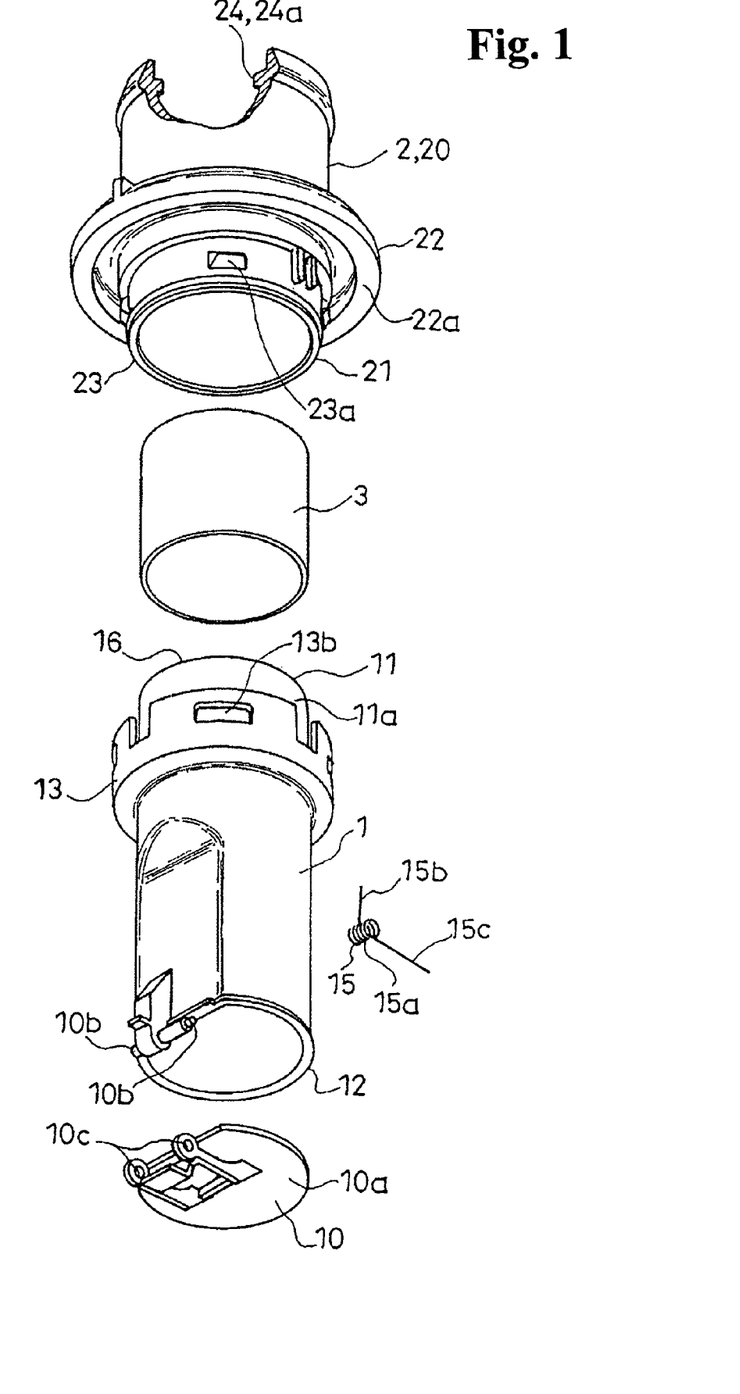
FIG. 1 is an exploded perspective view of a connector.
Figure 2:
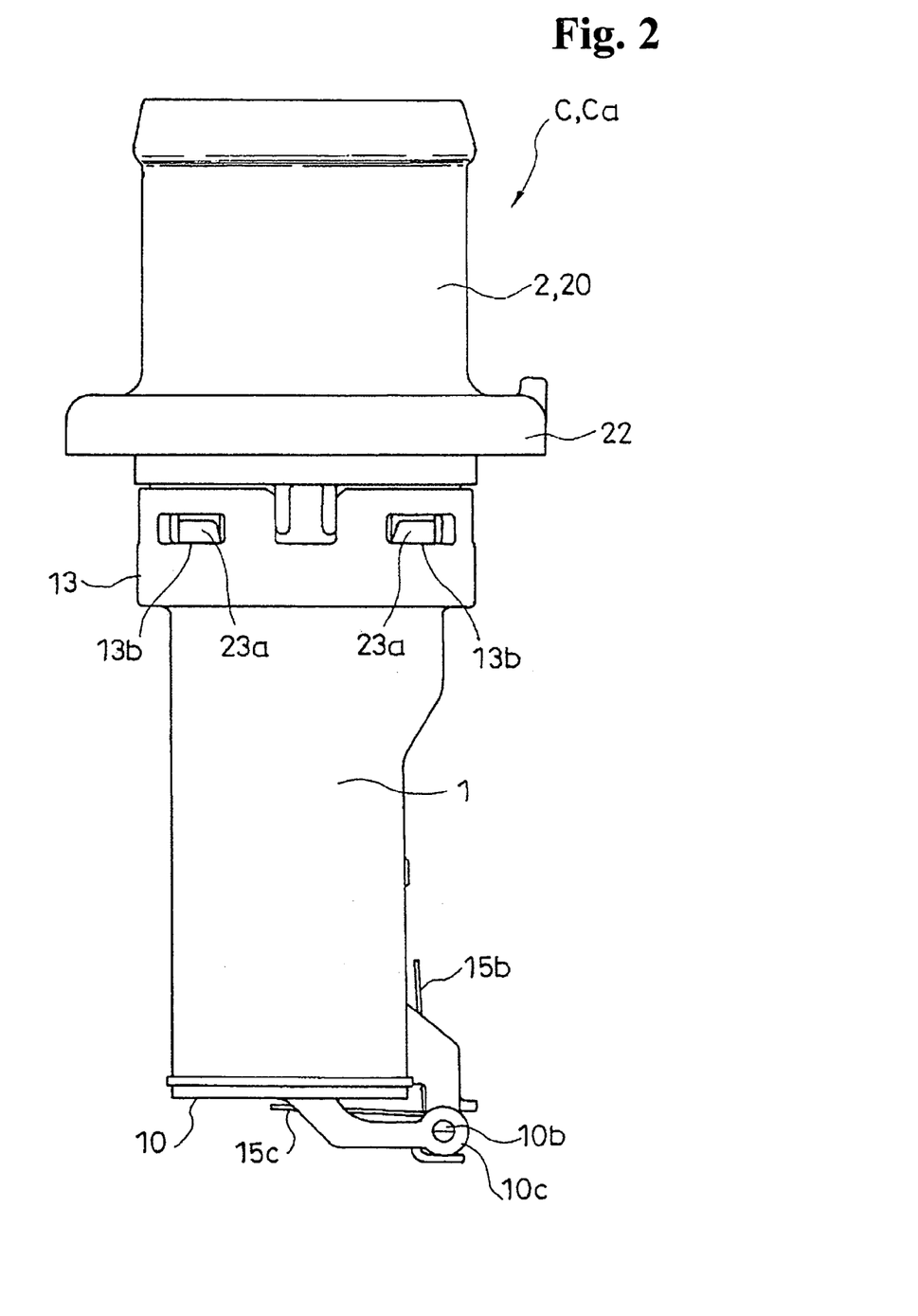
FIG. 2 is a side view of the same.
Figure 3:
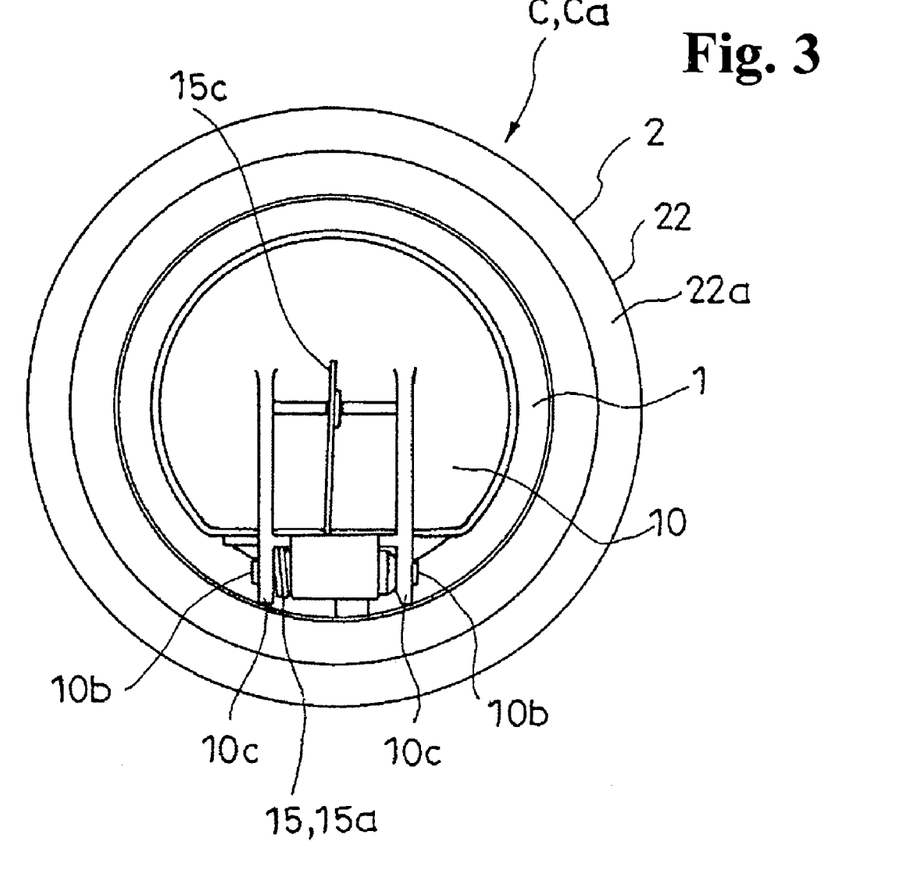
FIG. 3 is a bottom view of the same.
Figure 4:
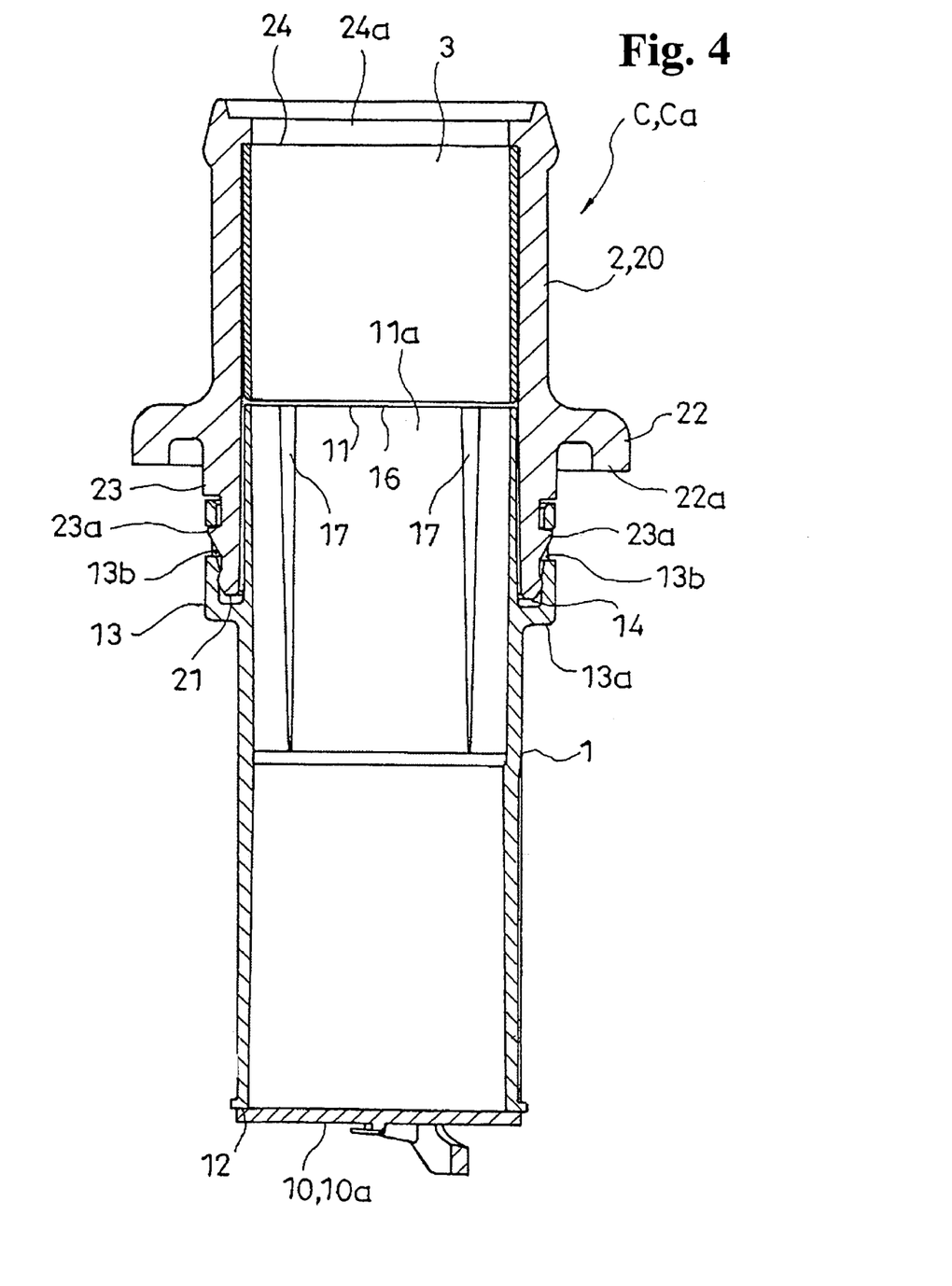
FIG. 4 is a cross-sectional view of the same.
Figure 5:
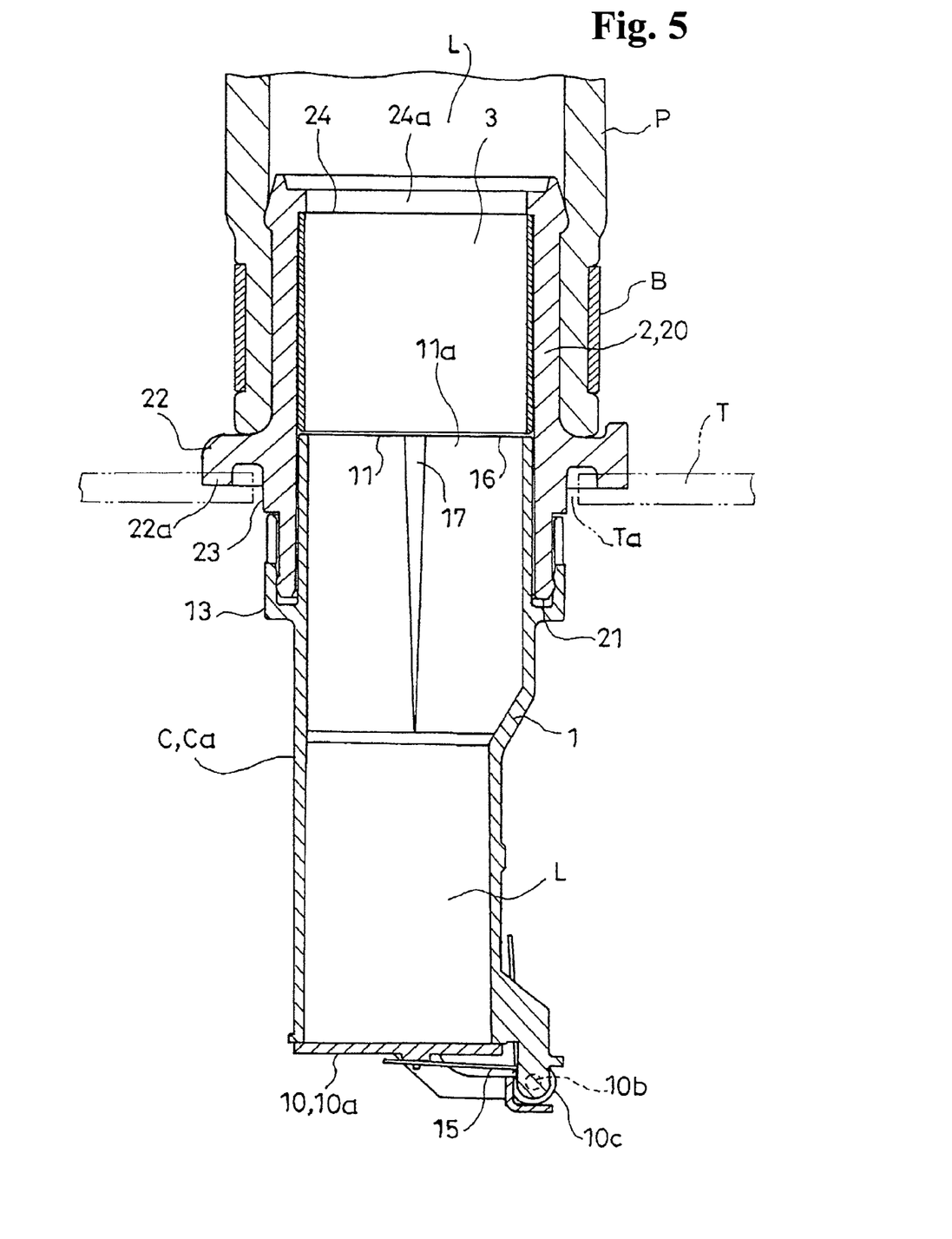
FIG. 5 is a cross-sectional view (a cross-sectional view in a position different from FIG. 4) showing a usage state of the same.
Figure 6:
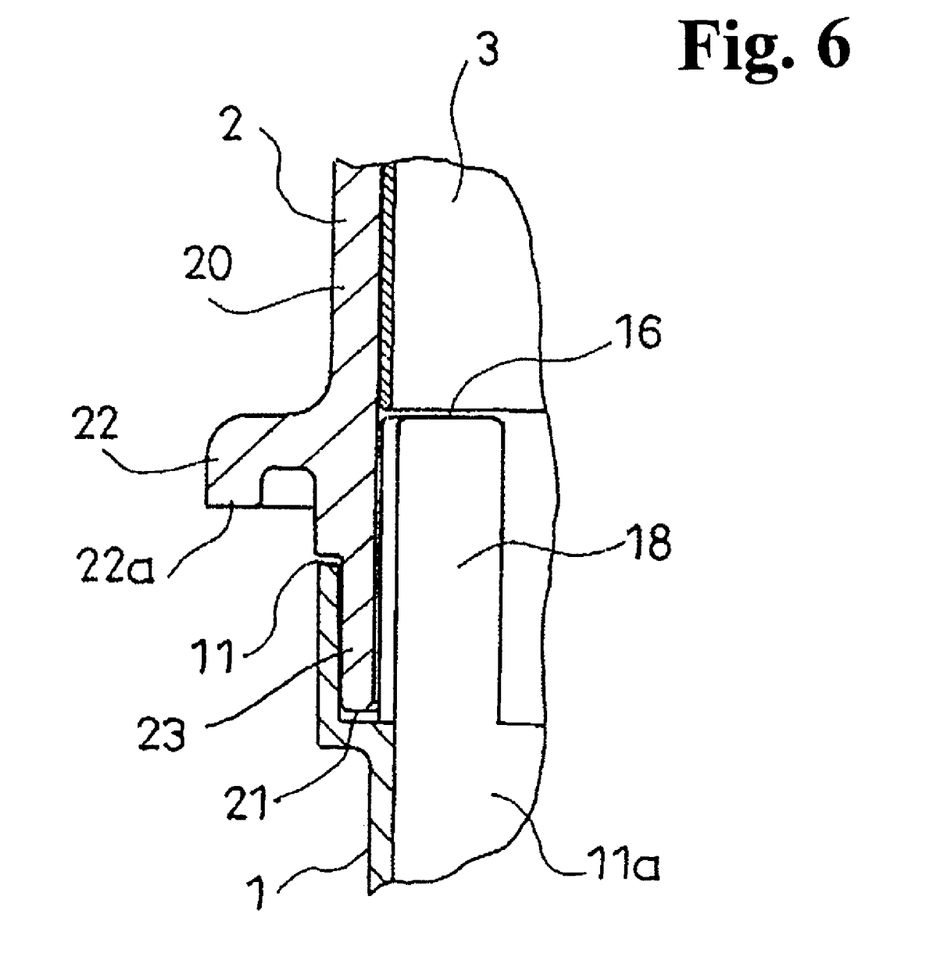
FIG. 6 is a cross-sectional structural view of essential parts showing a modified example of the connector.

Hereinafter, a typical embodiment of the present invention will be explained with reference to FIGS. 1 to 6. Incidentally, here, FIG. 1 shows each part constituting a connector C which is constituted as a check valve Ca according to an embodiment in a detached state; FIGS. 2 to 4 respectively show such connector C; and FIG. 5 shows a usage state of such connector C with a cross-sectional surface, while showing an outline of a cross-sectional state of a fuel tank T, which will be attached, by imaginary lines. (Incidentally, in the same figure, an annular raised portion 22a of a connecting cylinder body 2, which has been entered into the outline of the fuel tank T, becomes a welding platform relative to an external surface portion of this fuel tank T.) Also, FIG. 6 shows an example wherein one portion of the connector C shown in FIGS. 1 to 5 is modified by only showing modified portions thereof.

The connector C according to this embodiment is used for connecting the fuel tank T and a pipe P which communicates this fuel tank T with an external portion. As such pipe P, there are a fuel supply pipe continuing into a fuel filling opening, a pipe constituting a fuel supply line continuing into a fuel pump, an evaporation pipe continuing into a canister, a freezer pipe, and the like.

Also, the check valve Ca for the fuel tank according to this embodiment is equipped in the fuel tank T, and used for connecting this fuel tank T and the fuel supply pipe. Namely, in such check valve Ca, a valve body 10 is equipped in the above-mentioned connector C.

Such connector C includes a cylindrical main body 1, a connecting cylinder body 2, and a reinforcing cylinder body 3. The reinforcing cylinder body 3 is installed in an attachment portion 20 in order to reinforce the attachment portion 20 described hereinafter of the connecting cylinder body 2. Typically, this reinforcing effect can be enhanced by constituting a material, which constitutes the reinforcing cylinder body 3, to have rigidity higher than that of a material constituting the connecting cylinder body 2. In an illustrated example, the connecting cylinder body 2 is constituted by synthetic resin due to a relationship of fixation by welding relative to the fuel tank T, and the reinforcing cylinder body 3 is constituted by a material with rigidity higher than that of this synthetic resin, in the illustrated example, by metal such as SPCC and the like. Thereby, a weight increase of the connector C is controlled as much as possible, and also the thickness of the reinforcing cylinder body 3 can be minimized. In the illustrated example, such connector C further includes the valve body 10 in the cylindrical main body 1 so as to constitute the above-mentioned check valve Ca. Specifically, in the illustrated example, such valve body 10 closes a flow channel L of the cylindrical main body 1 to be openable.

In a case wherein the valve body 10 is provided in such connector C, and a ventilation-system valve such as a cutoff valve and the like is constituted, the flow channel L of the cylindrical main body 1 is usually open, and when a predetermined condition is provided, there is also a case wherein the flow channel L of this cylindrical main body 1 is closed by such valve body 10. In this case, although it is not shown in the figures, a float valve, which is moved to a valve-closed position due to a change of a level of fuel liquid, or the like is used as a valve body.

The cylindrical main body 1 is assembled with the connecting cylinder body 2 and constitutes the flow channel L communicating inside and outside of the fuel tank T. Namely, the cylindrical main body 1 opens both ends of the cylinder. In the illustrated example, such cylindrical main body 1 is constituted as an approximately cylindrical body. One end 11 side of a cylinder of the cylindrical main body 1 becomes an assembling portion 11a relative to the connecting cylinder body 2. In the illustrated example, as for the cylindrical main body 1, by inserting this assembling portion 11a into this connecting cylinder body 2 from the end of the cylinder on the side opposite to the after-mentioned attachment portion 20 in the connecting cylinder body 2, an internal portion of the cylindrical main body 1 and an internal portion of the connecting cylinder body 2 are communicated each other, and become the flow channel L for fuel. Namely, in the illustrated example, an external diameter of the assembling portion 11a of the cylindrical main body 1 is approximately equal to an internal diameter of the connecting cylinder body 2.

Also, in the illustrated example, on an outside of the cylindrical main body 1, and also on the side of the above-mentioned assembling portion 11a, a circling wall portion 13 encircling this cylindrical main body 1 is formed by providing an interval between the circling wall portion 13 and the end of the cylinder of this assembling portion 11a. An interval, which is approximately equal to the thickness of the connecting cylinder body 2 in any position of a circling direction thereof, is formed between an inner face of this circling wall portion 13 and an outer face of the cylindrical main body 1. Also, this circling wall portion 13 is integrally connected to the outer face of the cylindrical main body 1 in an end portion 13a on the other end 12 side of the cylinder of the cylindrical main body 1. Also, in this circling wall portion 13, plural window holes 13b are formed by providing an interval between neighboring window holes 13b in the circling direction thereof. Then, in the illustrated example, in a position wherein the assembling portion 11a of the cylindrical main body 1 is completely inserted into the connecting cylinder body 2, the after-mentioned latch-engaging projections 23a formed on the outer face of the connecting cylinder body 2 are entered into the above-mentioned window holes 13b, and latched and engaged, so that an assembled state with the connecting cylinder body 2 is maintained.

In the illustrated example, the valve body 10 is provided in this cylindrical main body 1 so as to usually close the other end 12 of the cylinder of such cylindrical main body 1. In the illustrated example, such valve body 10 is constituted by a cover plate 10a with a size covering the other end 12 of the cylinder of this cylindrical main body 1 from the outside. This cover plate 10a is assembled with the other end 12 of the cylinder of the cylindrical main body 1 to be turnable, and also one face thereof is urged in a direction of being pressed against such other end 12 of the cylinder by a torsion coil spring 15. In the drawings, the reference numeral 10b represents a turning axis of the cover plate 10a provided in the cylindrical main body 1, and the reference numeral 10c represents a bearing portion of this turning axis 10b formed on the other face side of the cover plate 10a. The torsion coil spring 15 is provided with a spring wound portion 15a through the above-mentioned turning axis 10b, and allows one end 15b of the spring to be pressed against a cylindrical main body 1 side, and the other end 15c of the spring to be pressed against the other face of the cover plate 10a. Such cylindrical main body 1 is disposed on an inside of the fuel tank T as mentioned hereinafter, and due to such valve body 10, an inflow of fuel into the fuel tank T through the fuel supply pipe can not be prevented by turning the cover plate 10a in a direction separating from the other end 12 of the cylinder of the cylindrical main body 1 against the urging of the above-mentioned spring 15. However, a back-flow of fuel into the fuel supply pipe can be prevented.

The connecting cylinder body 2 comprises the attachment portion 20 of the pipe P communicating the fuel tank T with the external portion, and is assembled with this cylindrical main body 1. This connecting cylinder body 2 also opens both ends of the cylinder. In the illustrated example, such connecting cylinder body 2 is also constituted as an approximately cylindrical body. An outside flange portion 22 circling a cylinder axis of this connecting cylinder body 2 is formed on an outside of this connecting cylinder body 2, and also between both ends of the cylinder thereof. In the illustrated example, one side sandwiching this outside flange portion 22 becomes the above-mentioned attachment portion 20, and the other side becomes an assembled portion 23 (a receiving portion) for the assembling portion 11a of the cylindrical main body 1. On the side facing an assembled portion 23 side in such outside flange portion 22, the annular raised portion 22a is formed in such a way as to fringe a protruded end of this outside flange portion 22. In the illustrated example, relative to an attachment hole Ta having a size which allows the assembled portion 23 of the connecting cylinder body 2 bored in the resin fuel tank T to pass through, but which does not allow the outside flange portion 22 to pass through, in a state wherein the assembled portion 23 of the connecting cylinder body 2 and the assembled cylindrical main body 1 are inserted into the fuel tank T from the outside of the fuel tank T, the check valve Ca is allowed to be equipped with such fuel tank T by welding such annular raised portion 22a by heat into the external surface portion of the fuel tank T.

In the illustrated example, the latch-engaging projections 23a, which latch and engage the window holes 13b formed in the circling wall portion 13 of the cylindrical main body 1, are formed on an outside of the assembled portion 23 of such connecting cylinder body 2. Then, in the illustrated example, accompanied by inserting the assembling portion 11a of the cylindrical main body 1 into an inside of the assembled portion 23 of the connecting cylinder body 2, while mainly the side of the circling wall portion 13 is elastically being deformed, the assembled portion 23 of the connecting cylinder body 2 is inserted between this circling wall portion 13 and an external face of the cylindrical main body 1, so that the latch-engaging projections 23a corresponding to the above-mentioned each window hole 13b are latched and engaged.

Also, in the illustrated example, the attachment portion 20 of the connecting cylinder body 2 of the check valve Ca is allowed to be inserted into the fuel supply pipe as the pipe P from one end thereof up to a position where this end hits the above-mentioned outside flange portion 22. Accordingly, the fuel tank T and the fuel supply pipe are connected through the check valve Ca. (FIG. 5) Specifically, in the illustrated example, a portion, extending from an edge of the outside flange portion 22 positioned on the outside of the fuel tank T in such connecting cylinder body 2, functions as the above-mentioned attachment portion 20. On the outside of the fuel supply pipe in which the attachment portion 20 of the connecting cylinder body 2 in the fuel supply pipe is inserted into an inside, a hose band B is wrapped around, and due to this hose band B, the fuel supply pipe and the attachment portion 20 are tightened firmly.

The reinforcing cylinder body 3 is housed inside such connecting cylinder body 2, and reinforces the attachment portion 20 of this connecting cylinder body 2. In the illustrated example, such reinforcing cylinder body 3 comprises an external diameter which is approximately equal to an internal diameter of the attachment portion 20 of the connecting cylinder body 2, and also is constituted as a cylindrical body whose both ends of the cylinder are open. Also, an internal diameter of an assembling portion 11a side of the above-mentioned cylindrical main body 1 is approximately equal to an internal diameter of such reinforcing cylinder body 3.

Then, in this embodiment, by a stopper portion 24 formed in an inside of the above-mentioned connecting cylinder body 2, and a holding end portion 16 of the cylindrical main body 1 positioned inside this connecting cylinder body 2 by the above-mentioned assembling, the reinforcing cylinder body 3 is sandwiched from both sides thereof, so that this reinforcing cylinder body 3 is positioned on an inside of the attachment portion 20 of the connecting cylinder body 2.

In the illustrated example, on the inside of the attachment portion 20 of the connecting cylinder body 2, a circling projection 24a circling the cylinder axis of this connecting cylinder body 2 is formed by slightly providing an interval between the circling projection 24a and the end of the cylinder of this attachment portion 20 side. Then, a protruding size from an inner face of the connecting cylinder body 2 of this circling projection 24a is made so as to be approximately equal to a thickness size of the reinforcing cylinder body 3. Also, an interval between this circling projection 24a, and the end of the cylinder (the above-mentioned one end 11 of the cylinder) of the cylindrical main body 1 on this assembling portion 11a side in a state wherein the assembling portion 11a is completely inserted into the assembled portion 23 of the connecting cylinder body 2, is made so as to be approximately equal to a whole length of a cylinder axis direction of the reinforcing cylinder body 3.

Thereby, in this embodiment, from a state wherein this reinforcing cylinder body 3 is inserted into the inside of the attachment portion 20 of the connecting cylinder body 2 from a cylinder end 21 side which is the side opposite to the attachment portion 20 of this connecting cylinder body 2 up to a position where one end of the cylinder of the reinforcing cylinder body 3 hits the above-mentioned circling projection 24a, the cylindrical main body 1 is assembled with this connecting cylinder body 2, so that the reinforcing cylinder body 3 can be installed in an inside of such attachment portion 20. Then, by the reinforcing cylinder body 3 installed in such a manner, rigidity capable of being connected with the fuel supply pipe, and further capable of being tightened firmly by the hose band, is provided to the attachment portion 20 of the connecting cylinder body 2.

Namely, in this embodiment, the above-mentioned circling projection 24a of the attachment portion 20 of the connecting cylinder body 2 functions as the above-mentioned stopper portion 24, and also the end of the cylinder (the above-mentioned one end 11 of the cylinder) of the cylindrical main body 1 on the assembling portion 11a side of the cylindrical main body 1 functions as the above-mentioned holding end portion 16.

In the illustrated example, since an internal diameter of a holding end portion 16 side of the cylindrical main body 1 is approximately equal to an internal diameter of the reinforcing cylinder body 3 as mentioned above, the above-mentioned structure which allows to position the reinforcing cylinder body 3 never blocks a flow of fuel sent from the fuel supply pipe.

Also, in the illustrated example, projections 17 protruding toward a center of this cylindrical main body 1 are formed in the holding end portion 16 of the above-mentioned cylindrical main body 1.

Namely, in the illustrated example, the projections 17, wherein one end of a strip is positioned in the holding end portion 16 of such cylindrical main body 1 so as to form a rib shape continuing toward the other end 12 side of the cylinder of this cylindrical main body 1, are provided in four places by providing an interval between neighboring projections in a direction circling a cylinder axis of this cylindrical main body 1.

Thereby, in the illustrated example, due to such projections, the reinforcing cylinder body 3 can be reliably supported by the holding end portion 16.

Incidentally, as shown in FIG. 6, in a case wherein the cylindrical main body 1 and the connecting cylinder body 2 are assembled in such a way that the assembled portion 23 of the connecting cylinder body 2 is inserted into the inside of the combining portion 11a of the cylindrical main body 1, a holding wall portion 18 is formed on the inside of this combining portion 11a by providing an interval which allows the combined portion 23 of the connecting cylinder body 2 to be received between the holding wall portion 18 and an inner face of this assembling portion 11a, so that an end portion of this holding wall portion 18 becomes the above-mentioned holding end portion 16. In this case, the holding wall portion 18 may be separated into several portions in a direction circling the cylinder axis of the cylindrical main body 1.

Incidentally, all contents of the specification, claims, drawings, and abstract of Japanese Patent Application No. 2008-300590 filed on Nov. 26, 2008 are cited in their entirety herein and are incorporated as a disclosure of the specification of the present invention.

What is claimed is:

1. A connector for a fuel tank, comprising:
   a cylindrical main body having an outer surface, a holding end portion at one end thereof, an assembling portion on one side thereof, and a wall portion projecting outwardly from the outer surface and extending toward the holding end portion to form a space between the outer surface and the wall portion, said wall portion being integrally formed with the main body as one unit and having therein a plurality of holes spaced apart from each other and a length less than a length between the holding end portion and a portion where the wall portion is integrally fixed to the main body;
   a connecting cylinder body having an attachment portion of a pipe which connects a fuel tank and an external portion, an assembled portion formed at one side thereof and extending beyond the attachment portion, said assembled portion being assembled with the assembling portion of the cylindrical main body and having engaging projections projecting outwardly from an outer surface thereof, a stopper portion formed on an inside thereof at a side opposite to the assembled portion, and a smooth inner surface extending from a portion adjacent to the stopper portion to the assembled portion; and
   a reinforcing cylinder body housed inside the connecting cylinder body,
   wherein when assembling the cylindrical main body and the connecting cylinder body, the assembling portion is disposed in the assembled portion, the assembled portion is disposed in the space between the outer surface and the wall portion, and the engaging projections engage the holes, and
   the reinforcing cylinder body is sandwiched from both sides by the stopper portion and the holding end portion so that the reinforcing cylinder body is positioned on an inside of the attachment portion of the connecting cylinder body.

2. A connector for a fuel tank according to claim 1, wherein the cylindrical main body includes a valve body which closes a flow channel of the cylindrical main body to be openable, or is capable of closing the flow channel of the cylindrical main body.

3. A connector for a fuel tank according to claim 1, wherein said connecting cylinder body is made of synthetic resin, and the reinforcing cylinder body made of a material having rigidity greater than that of the connecting cylinder body.

4. A connector for a fuel tank according to claim 3, wherein the connecting cylinder body includes, as the attachment portion, a flange portion projecting outwardly from the outer surface thereof, said assembling portion being disposed in the assembled portion such that the holding end portion is located at about an upper surface of the flange.

5. A connector for a fuel tank according to claim 4, wherein said wall portion includes slits to partially separate an upper part thereof.

6. A connector for a fuel tank according to claim 1, wherein the assembling portion is disposed inside the connecting cylinder body such that the holding end portion is located at about a surface of the attachment portion opposite of the stopper portion, to support the reinforcing cylinder body.

7. A connector for a fuel tank according to claim 6, wherein the reinforcing cylinder body has an external diameter substantially equal to an internal diameter of the connecting cylinder body throughout an entire length thereof, and an internal diameter of the assembling portion is substantially equal to an internal diameter of the reinforcing cylinder body.

8. A connector for a fuel tank according to claim 1, wherein the space is defined between the assembling portion and the wall portion.

9. A fuel tank check valve, comprising:
   a cylindrical main body having an outer surface, a holding end portion at one end thereof, an assembling portion on one side thereof, a valve body on another side, and a wall portion projecting outwardly from the outer surface and extending toward the holding end portion to form a space between the outer surface and the wall portion, said wall portion being integrally formed with the main body as one unit and having therein a plurality of holes spaced apart from each other and a length less than a length between the holding end portion and a portion where the wall portion is integrally fixed to the main body;
   a connecting cylinder body having an attachment portion of a fuel supply pipe, an assembled portion formed at one side thereof and extending beyond the attachment portion, said assembled portion being assembled with the assembling portion of the cylindrical main body and having engaging projections projecting outwardly from an outer surface thereof, and a stopper portion formed on an inside thereof at a side opposite to the assembled portion, and a smooth inner surface extending from a portion adjacent to the stopper portion to the assembled portion; and a reinforcing cylinder body housed inside the connecting cylinder body, wherein when assembling the cylindrical main body and the connecting cylinder body, the assembling portion is disposed in the assembled portion, the assembled portion is disposed in the space between the outer surface and the wall portion, and the engaging projections engage the holes, and the reinforcing cylinder body is sandwiched from both sides by the stopper portion and the holding end portion so that the reinforcing cylinder body is positioned on an inside of the attachment portion of the connecting cylinder body.

10. A fuel tank check valve according to claim 9, wherein an internal diameter of the assembling portion and an internal diameter of the reinforcing cylinder body are approximately equal.

11. A fuel tank check valve, comprising:

a cylindrical main body having an outer surface, an assembling portion on one side thereof with a holding end portion, a valve body on another side, and a wall portion projecting outwardly from the outer surface and extending toward the one side to form a space between the outer surface and the wall portion, said wall portion being integrally formed with the main body as one unit and having therein a plurality of holes spaced apart from each other;

a connecting cylinder body having an attachment portion of a fuel supply pipe, an assembled portion assembled with the assembling portion of the cylindrical main body and having engaging projections projecting outwardly from an outer surface thereof, and a stopper portion formed on an inside thereof;

a reinforcing cylinder body housed inside the connecting cylinder body; and projections protruding toward a center of the cylindrical main body formed in the assembling portion of the cylindrical main body to support the reinforcing cylinder body, wherein when assembling the cylindrical main body and the connecting cylinder body, the assembling portion is disposed in the assembled portion, the assembled portion is disposed in the space between the outer surface and the wall portion, and the engaging projections engage the holes, and the reinforcing cylinder body is sandwiched from both sides by the stopper portion and the holding end portion so that the reinforcing cylinder body is positioned on an inside of the attachment portion of the connecting cylinder body.

* * * * *